(12) United States Patent
Stoianovici et al.

(10) Patent No.: US 12,521,102 B2
(45) Date of Patent: Jan. 13, 2026

(54) STRAIGHT-INSERTION, FORWARD-LESS FIRE, LOW NOISE, PNEUMATIC SOFT TISSUE BIOPSY NEEDLE

(71) Applicant: THE JOHNS HOPKINS UNIVERSITY, Baltimore, MD (US)

(72) Inventors: Dan Stoianovici, Reisterstown, MD (US); Changhan Jun, College Park, MD (US); Doru Petrisor, Lutherville, MD (US); Misop Han, West Friendship, MD (US)

(73) Assignee: The Johns Hopkins University, Baltimore, MD (US)

( * ) Notice: Subject to any disclaimer, the term of this patent is extended or adjusted under 35 U.S.C. 154(b) by 254 days.

(21) Appl. No.: 16/487,236

(22) PCT Filed: Feb. 22, 2018

(86) PCT No.: PCT/US2018/019117
§ 371 (c)(1),
(2) Date: Aug. 20, 2019

(87) PCT Pub. No.: WO2018/169658
PCT Pub. Date: Sep. 20, 2018

(65) Prior Publication Data
US 2021/0128122 A1 May 6, 2021

Related U.S. Application Data

(60) Provisional application No. 62/461,891, filed on Feb. 22, 2017.

(51) Int. Cl.
*A61B 10/02* (2006.01)

(52) U.S. Cl.
CPC .. *A61B 10/0275* (2013.01); *A61B 2010/0208* (2013.01)

(58) Field of Classification Search
CPC .................... A61B 10/0275; A61B 2010/0208
See application file for complete search history.

(56) References Cited

U.S. PATENT DOCUMENTS 3,342,175 A * 9/1967 Bulloch ............. A61B 10/0266
600/567
4,917,100 A * 4/1990 Nottke ............... A61B 10/0275
600/562

(Continued)

FOREIGN PATENT DOCUMENTS

EP 2074949 B1 1/2009

OTHER PUBLICATIONS

Dimaio, et al., Needle steering and motion planning in soft tissues. IEEE Trans Biomed Eng. Jun. 2005;52(6):965-74.

(Continued)

*Primary Examiner* — Sean P Dougherty

(57) ABSTRACT

An embodiment in accordance with the present invention provides a new biopsy needle that may address several problems identified with currently available biopsy needles. In short, the new needle has a straighter insertion path, no forward fire, lower noise, and is pneumatic power-assisted so that it can be operated with one hand. These features improve biopsy targeting, provide safer operation for the patient and personnel, reduce patient discomfort, and respectively make optional the help of an assistant at biopsy.

17 Claims, 13 Drawing Sheets

(56) References Cited

U.S. PATENT DOCUMENTS

| | | | |
|---|---|---|---|
| 4,940,061 A * | 7/1990 | Terwilliger | A61B 10/0275 606/171 |
| 5,161,542 A * | 11/1992 | Palestrant | A61B 10/0275 600/567 |
| 5,195,533 A * | 3/1993 | Chin | A61B 10/0275 600/564 |
| 5,249,582 A | 10/1993 | Taylor | |
| 5,334,185 A * | 8/1994 | Giesy | A61M 25/06 604/533 |
| 5,769,086 A * | 6/1998 | Ritchart | A61B 10/0275 600/566 |
| 5,779,647 A * | 7/1998 | Chau | A61B 10/0275 600/564 |
| 5,928,162 A | 7/1999 | Giurtino et al. | |
| 5,971,939 A | 10/1999 | DeSantis et al. | |
| 6,110,128 A | 8/2000 | Andelin et al. | |
| 6,273,861 B1 | 8/2001 | Bates et al. | |
| 6,387,056 B1 | 5/2002 | Kieturakis | |
| 6,402,701 B1 | 6/2002 | Kaplan et al. | |
| 6,419,641 B1 * | 7/2002 | Mark | A61B 10/0275 600/564 |
| 6,485,436 B1 | 11/2002 | Truckai et al. | |
| 7,611,474 B2 | 11/2009 | Hibner et al. | |
| 7,658,718 B2 | 2/2010 | Miller et al. | |
| 7,794,411 B2 | 9/2010 | Ritchart et al. | |
| 7,938,786 B2 | 5/2011 | Ritchie et al. | |
| 8,231,544 B2 | 7/2012 | Mark | |
| 8,388,550 B2 * | 3/2013 | Koehler | A61B 10/0275 606/171 |
| D690,009 S | 9/2013 | Schembre et al. | |
| 10,987,127 B2 * | 4/2021 | Wilson | A61B 17/320016 |
| 2002/0065474 A1 * | 5/2002 | Viola | A61B 10/0275 600/564 |
| 2004/0133124 A1 | 7/2004 | Bates et al. | |
| 2006/0184063 A1 | 8/2006 | Miller | |
| 2007/0106176 A1 * | 5/2007 | Mark | A61B 10/0275 606/167 |
| 2009/0131824 A1 * | 5/2009 | Andrisek | A61B 10/0275 600/567 |
| 2009/0204022 A1 | 8/2009 | Schwindt | |
| 2009/0299221 A1 * | 12/2009 | Bacon | A61B 10/0275 600/567 |
| 2011/0208089 A1 | 8/2011 | Sundheimer et al. | |
| 2011/0295199 A1 * | 12/2011 | Popovic | A61B 17/3421 604/95.01 |
| 2012/0203135 A1 | 8/2012 | Heske et al. | |
| 2012/0220894 A1 * | 8/2012 | Melsheimer | A61B 10/0275 600/567 |
| 2012/0221007 A1 | 8/2012 | Batten et al. | |
| 2012/0265095 A1 | 10/2012 | Fiebig | |
| 2012/0302915 A1 | 11/2012 | Lee | |
| 2013/0030323 A1 * | 1/2013 | Smith | A61B 10/0275 600/567 |
| 2013/0046316 A1 * | 2/2013 | Sullivan | A61M 1/7411 606/115 |
| 2013/0345710 A1 | 12/2013 | Kleiner et al. | |
| 2015/0045665 A1 * | 2/2015 | Lau | A61B 90/39 600/431 |
| 2016/0074020 A1 * | 3/2016 | Ackroyd | A61B 10/0233 600/567 |
| 2016/0081673 A1 * | 3/2016 | Wehbe | A61B 10/0266 600/567 |
| 2016/0249890 A1 * | 9/2016 | Akerfeldt | A61B 10/0275 600/567 |
| 2016/0262733 A1 * | 9/2016 | Schlarb | A61B 10/0275 |
| 2018/0103939 A1 * | 4/2018 | Van Liere | A61B 10/0283 |
| 2021/0393243 A1 * | 12/2021 | Nevo | A61B 10/0266 |

OTHER PUBLICATIONS

Dimaio, et al., Interactive simulation of needle insertion models. IEEE Trans Biomed Eng. Jul. 2005;52(7):1167-1179.

Blumenfeld, et al., Transperineal prostate biopsy under magnetic resonance image guidance: a needle placement accuracy study. J Magn Reson Imaging. Sep. 2007;26(3):688-94.

Stoianovici, et al., AcuBot: a robot for radiological interventions. IEEE Trans Rob Autom. 2003;19(5):927-930.

Stoianovici, et al., "MRI Stealth" robot for prostate interventions. Minim Invasive Ther Allied Technol. 2007;16(4):241-8.

Stoianovici, et al., MRI-Safe Robot for Endorectal Prostate Biopsy. IEEE Trans Mechatronics. 2014;19(4):1289-1299.

Stoianovici, et al., Endocavity Ultrasound Probe Manipulators. IEEE ASME Trans Mechatron. Jun. 2013;18(3):914-921.

Simpfendorfer, et al., Trocar-sharpened needles for image-guided prostate biopsy improve sample quality and performance: first clinical results. J Endourol. Nov. 2014;28(11):1384-8.

Zuckner, et al., Polley-Bickel needle broken during biopsy. JAMA. Sep. 30, 1968;206(1):133-4.

Tsivian, et al., The effect of noise-cancelling headphones or music on pain perception and anxiety in men undergoing transrectal prostate biopsy. Urology. Jan. 2012;79(1):32-6.

Li, et al., Measurement of the Friction Force Inside the Needle in Biopsy. J. Manuf. Sci. Eng. 2015;138(3), 031003.

Kanao, et al., Can transrectal needle biopsy be optimised to detect nearly all prostate cancer with a volume of ≥0.5 mL? A three-dimensional analysis. BJU Int. Nov. 2013;112(7):898-904.

* cited by examiner

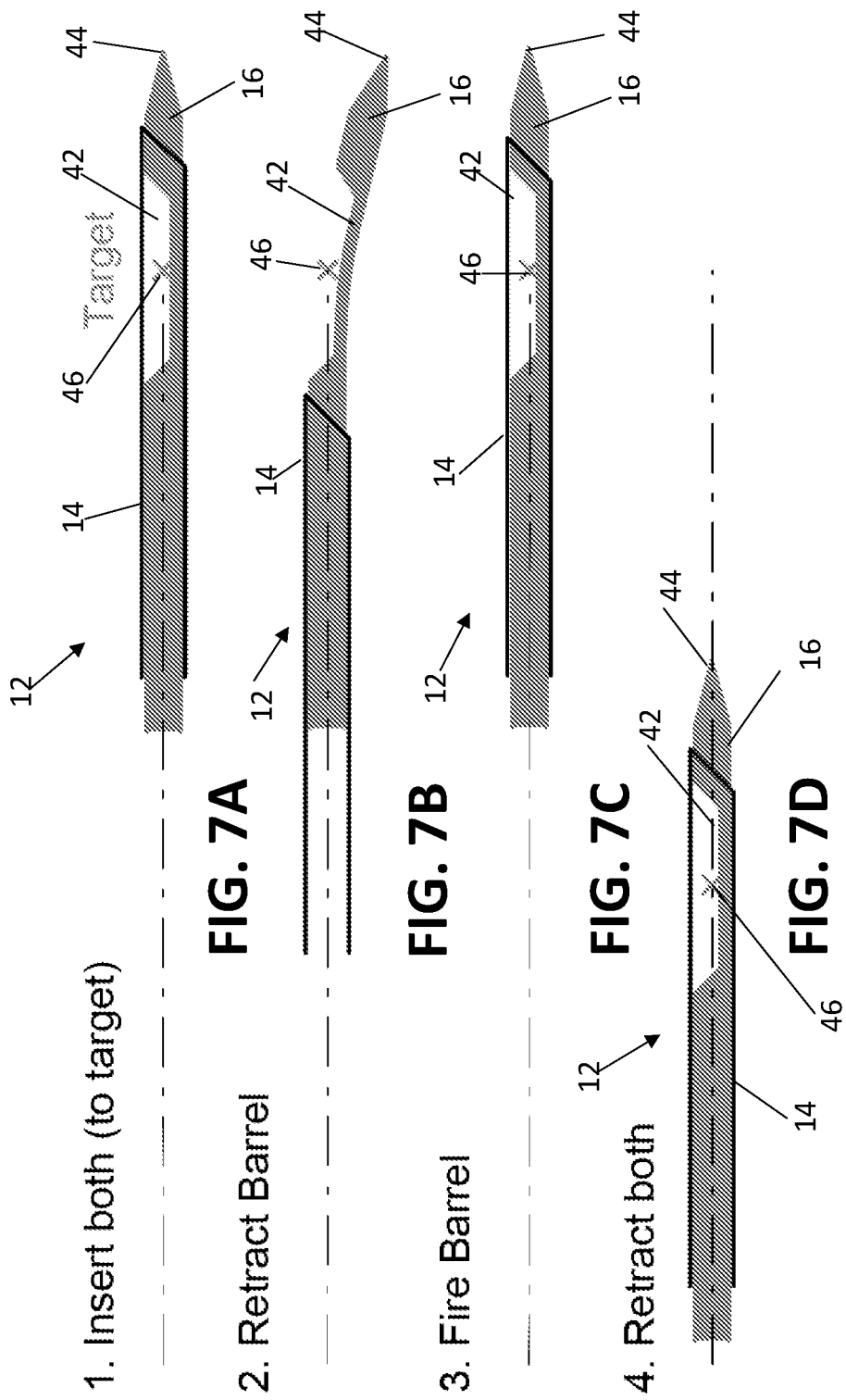

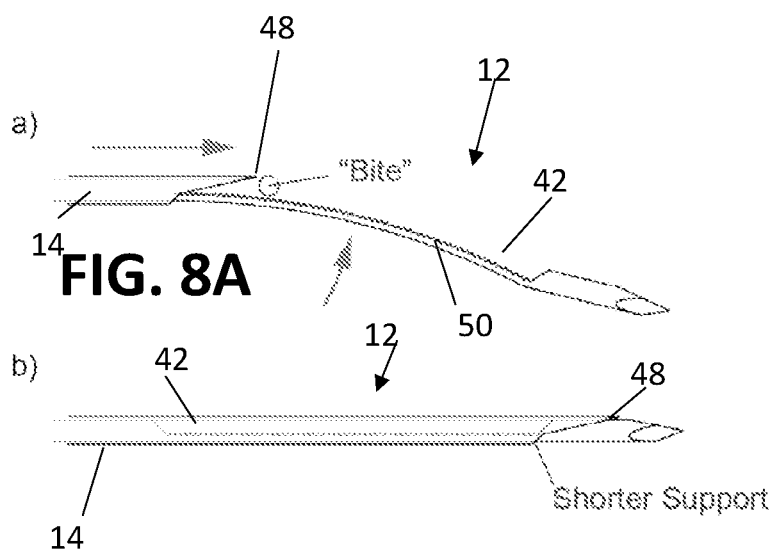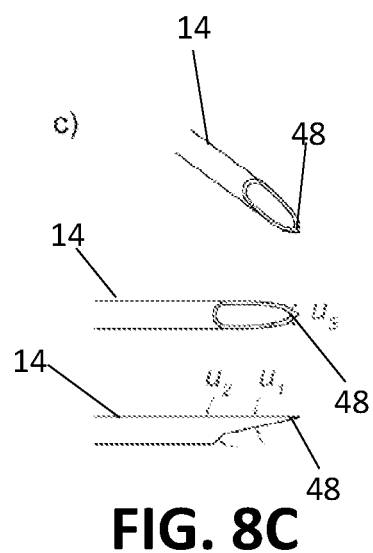
FIG. 8A
FIG. 8B
FIG. 8C

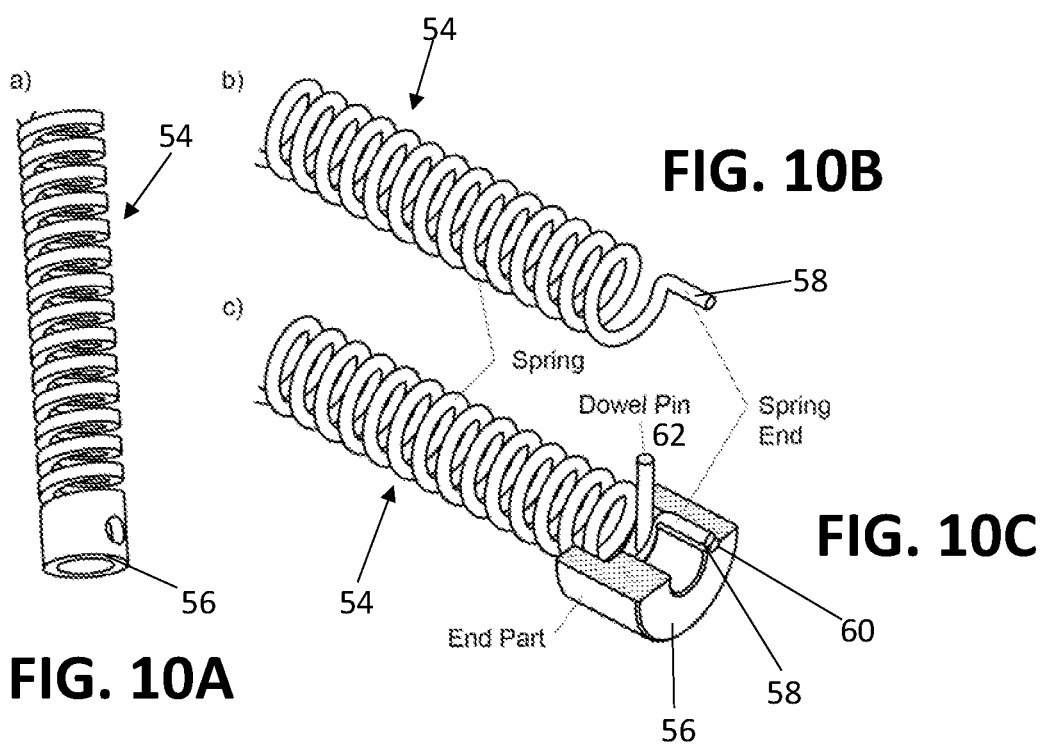

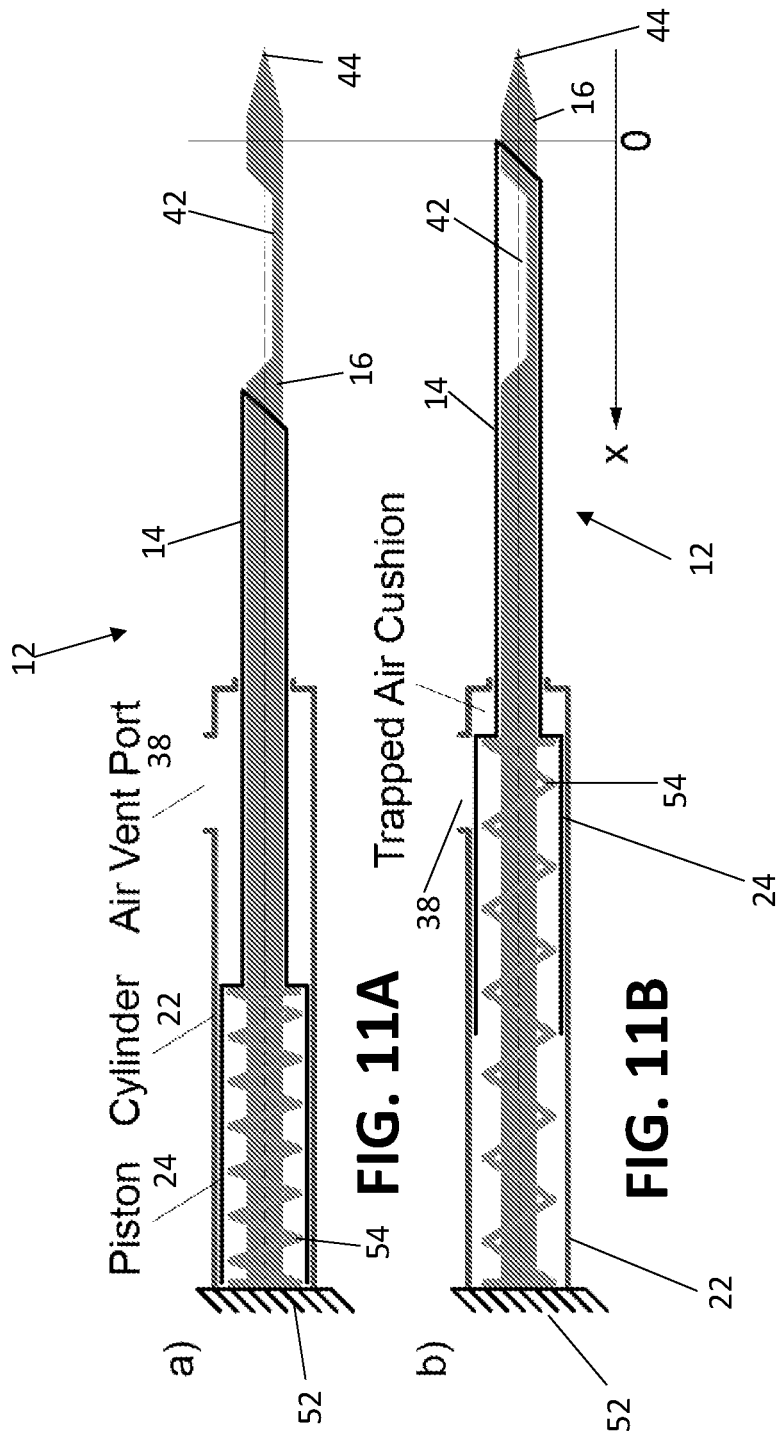

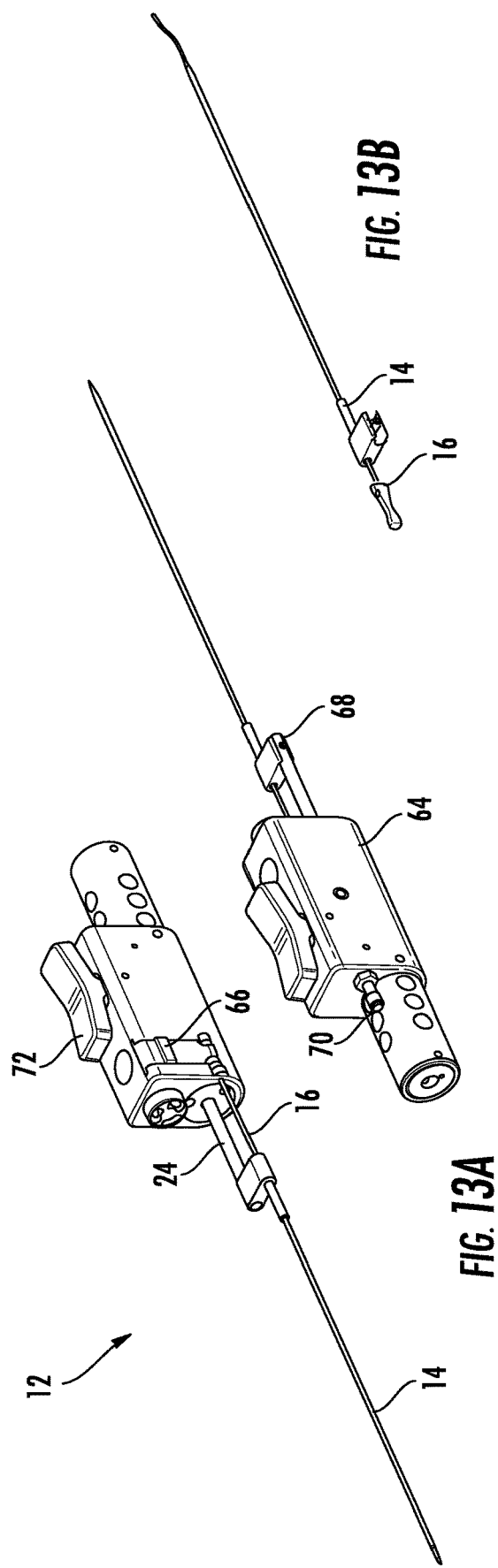

STRAIGHT-INSERTION, FORWARD-LESS FIRE, LOW NOISE, PNEUMATIC SOFT TISSUE BIOPSY NEEDLE

CROSS REFERENCE TO RELATED APPLICATION

This application is a 35 U.S.C. § 371 U.S. national entry of International Application PCT/US2018/019117, having an international filing date of Feb. 22, 2018, which claims the benefit of U.S. Provisional Application No. 62/461,891 filed on Feb. 22, 2017 the content of each of the aforementioned applications is herein incorporated by reference in their entirety. U.S. Provisional Patent Application No. 62/296,837 filed on Feb. 18, 2016, is also incorporated by reference herein.

FIELD OF THE INVENTION

The present invention relates generally to medical devices. More particularly, the present invention relates to a straight-insertion, forward-less fire, low noise, pneumatic soft tissue biopsy needle.

BACKGROUND OF THE INVENTION

Soft tissue (core) biopsy is a widely used procedure to diagnose various histopathologic conditions that provides tissue samples for examination. Numerous biopsy needles are available commercially. Commonly, biopsy needles are trocar needles with a stylet and a barrel. With few exceptions, these present similar geometry of the needle point, sample loading magazine, and sampling motion sequence. Their performance is commonly less than ideal in several respects, regardless of the manufacturer.

A biopsy needle or device commonly includes the needle itself and a needle driver (biopsy firing mechanism, a "gun"). The needle is typically a trocar type needle with an inner stylet and an outer barrel (cannula). Several aspects could be improved in their performance.

With few exceptions, most needles present similar geometry of the needle point, sample loading magazine, and sampling motion sequence. The stylet point is typically asymmetrically sharpened (bevel point), as shown in FIG. 1A. During insertion the beveled surface acts like a rudder deflecting the path of the needle laterally. FIGS. 1A and 1B illustrate needle point geometry and insertion path for a common biopsy needle. FIG. 1A illustrates an asymmetric point and insertion path deflected by rudder effect and FIG. 1B illustrates a symmetric point with straighter path.

Studies have shown that depending on the needle gauge, type of tissues, and the depth of needle insertion, needle deflection with the asymmetric point can be a major cause of targeting errors. For example, with an 18-Gauge needle in gelatin the lateral deflections can be as large as 10% of the insertion depth. These become especially problematic when modern image-guided technologies such as robots are used to guide the needle, since deflection errors are a substantial component of the overall error. As such, needle problems may defeat the purpose of the guidance technology itself.

Alternatively, symmetrically sharpened points circumvent this problem by eliminating the rudder effect, as shown in FIG. 1B. Studies have shown that symmetric points reduce needle deflections substantially.

While changing from one sharpening shape to the other is straightforward, why is it that the overwhelming majority of needles today still use the asymmetric point? It turns out that if one takes an asymmetric needle and re-sharpens it symmetrically, the needle does not take the biopsy sample as well. Therefore, the needle bevel plays a role in the sample collection mechanism.

The classic needle motion sequence at biopsy is presented in FIGS. 2A-2D. FIGS. 2A-2D illustrate a typical biopsy motion sequence of asymmetric point needles. The firing mechanism is typically spring actuated and manually loaded. Starting with a loaded needle, the following steps are:

1) The needle (stylet and barrel together) is inserted (under various imaging modalities) towards the desired biopsy target. The insertion is stopped short of the target, as shown in FIG. 2A. The distance short of target is typically large, ideally equal to the distance from the center of the magazine slot to the point of the stylet.
2) The stylet is then pushed further as shown in FIG. 2B. The stroke of this motion is constant. Ideally, the target center would now be centered over the magazine slot, as shown in the figure. The motion of the stylet is either performed manually in the case of Singe-Fire guns (also called Semi-Automatic), or by depressing a lever that fires a spring in case of a Dual-Fire (also called Fully-Automatic) gun. In any case, the rudder effect of the point combined with the small cross section under the sample magazine slot makes the point of the needle to dive therefore curving the stylet under the sample slot, as shown.
3) The barrel of the needle is then quickly advanced (fired) over the stylet, as shown in FIG. 2C. While advancing, the bottom edge of the barrel pulls up the curved part of the stylet. This helps loading the sample magazine. At the same time, the top edge of the barrel (normally sharpened on the opposite side relative to the stylet bevel) cuts and loads the biopsy specimen within the magazine.
4) Finally, the needle (stylet and barrel together) is then pulled all the way out, as shown in FIG. 2D. The sample is then collected from the magazine by retracting the barrel. The spring(s) is reloaded and the sequence repeats from Step 1 to the next target.

The sequence above underscores that the curvature under the magazine slot depicted in FIG. 2B plays a critical role in loading the sample. When the barreled is fired in Step 3, this lifts the magazine toward the tissues helping the magazine to be loaded while it is sliced.

This is why most needles today still use the asymmetric point. If the needle had a symmetric point, the point would dive less or not dive, there will be less or no curvature, and the magazine will not load as well, deteriorating the quality of the biopsy specimens.

An interesting observation is that the asymmetric point is only helpful for the dive in Step 2, yet harmful in Step 1, a collateral damage effect. Little help comes from the opposed sides of the stylet and barrel bevels that create opposite rudder effects. Unfortunately, the barrel bevel is substantially smaller and the two do not balance and the path is deflected, as illustrated in FIG. 1A.

Overall, the stylet bevel plays a critical role in the sample collection mechanism. Moreover, the forward motion of the barrel in Step 2 plays a role that is just as critical. It is both the bevel and the forward motion that make the point dive. With no forward motion the curvature under the magazine slot would not exist, deteriorating sample loading. As such, most common biopsy needles not only have a bevel point but also forward motion.

As shown above, in the typical biopsy motion sequence the initial needle insertion (Step 1) must be short of the target. This distance is a known parameter of the needle and the physician can normally account for it. Moreover, most needles do this, so most physicians are used to it. However, while this is combined with the defected insertion path and further dive of the stylet, targeting is difficult.

The most advanced typical biopsy needles use a Dual-Fire sequence (also called Fully-Automatic). Here, the stylet is fired first, as illustrated in FIG. 2B, and then the barrel is also fired, as illustrated in FIG. 2C, in quick succession. This makes it impossible to image and verify if the needle is at target before firing the biopsy, only retroactively. For target verification under image guidance and possible adjustment before sampling, Single-Fire needles are preferable.

As shown in above, the forward motion of the stylet and barrel are functional requirements of the typical biopsy needles and most needles fire forward. For Singe-Fire guns the insertion in FIG. 2B is performed manually. With this, the advancement is actively controlled by the physician and may be monitored, therefore is not less safe than the insertion in FIG. 2A. But with Dual-Fire guns this is a rapid (fire) spring unloading motion. Firing takes a few milliseconds, and could not be stopped in case of an error. If the target is near critical anatomical structures and the Forward-Fire Distance, as illustrated in FIGS. 2A-2D, is misjudged the forward motion may hit the structure. Moreover, if the needle hits a stiffer structure (bone) the point of the needle may bend. This may prevent the stylet from being retracted back into the barrel making the entire needle difficult to retract from the tissues.

Referring to the biopsy motion sequence presented above, in the first Step of FIG. 2A the stylet and barrel are inserted together. During this motion the point of the stylet is supported by the barrel. However, in Step 2 of FIG. 2B the stylet must be inserted independently. During this motion the point of the stylet is supported solely by the section of the stylet under the magazine slot, of thickness t in FIG. 3. FIG. 3 illustrates a cross sectional thickness of the sample magazine slot. Therefore, t should be sufficiently large to provide the structural support of the point during insertion.

If broken at biopsy, the point of the stylet would be very difficult to remove from the tissues, likely necessitating a surgical intervention to preclude permanent damage to the body structure. This hazard would have critical severity according to the 21 CFR 803.3(bb)(1) definition of injury. To mitigate the risk, needle manufacturers increase the thickness t so that the likelihood of this hazard occurring is nearly impossible. Indeed, no broken needle incidents have been reported since 1968.

However, for the same stylet diameter (d) this measure reduces the thickness of the biopsy slot (s=d−t), therefore reduces the capable thickness of the biopsy samples. If the point would not have to be inserted independent of the barrel, the thickness t could be safely reduced, possibly increasing the thickness of the sample for the same diameter needle. Similarly, the length of the biopsy slot could also be increased.

Core biopsy guns are notoriously noisy when fired, with a typical snapping sound level in excess of 100 dB. This causes patient pain, anxiety, elevated stress and blood pressure levels in patients, and patient motion at biopsy. Studies have shown that the use of noise-canceling headphones and listening to soothing music could make the biopsy experience less painful, and pointed out the need for less noisy biopsy guns.

Commonly, core biopsy guns are spring loaded. When the spring mechanism is released from an original preload, the stylet and/or barrel reach high speeds (on the order of 5 [m/s]) and are quickly stopped into a stopper. The impact at the end of stroke accounts for a predominant part of the firing noise. The use of softer stopper materials provides slight improvement. Manufacturers have not yet found effective ways to substantially reduce or muffle the noise.

Therefore, it would be advantageous to provide a biopsy needle that has a straighter insertion path no forward fire, lower noise, and is pneumatic power assisted so that it can be operated with one hand. These features may improve biopsy targeting, provide safer operation for the patient and personnel, reduce patient discomfort, and respectively make optional the help of an assistant at biopsy.

SUMMARY OF THE INVENTION

The foregoing needs are met, to a great extent, by the present invention, wherein in one aspect a device for biopsy includes a needle assembly having a longitudinal axis, proximal end and a distal end. The device includes a stylet wherein the stylet comprises a point at the distal end, and a magazine for loading the biopsy sample, wherein the magazine has a structurally curved shape. The device includes a barrel, having a proximal end and a distal end, and wherein the barrel can move over the stylet. The device also includes a firing sequence comprising motion of the barrel and the stylet that slices and collects the biopsy sample.

In accordance with an aspect of the present invention, the magazine has a striated surface. The distal end of the needle is bent back in an opposite direction of the structurally curved shape of the magazine, such that the distal end of the needle is oriented straight along the longitudinal axis of the needle when the distal end of the barrel is near the stylet point. The barrel and stylet have bevel points. The firing sequence does not advance any needle components past the distal end of the needle. The barrel and stylet rotate relatively to orient the point of the stylet straight along the longitudinal axis of the needle. At least a portion of the stylet point is encased within the barrel at a time of needle insertion. The firing sequence includes retracting the barrel relative to the stylet and then readvancing it. The barrel has a 4-facet sharp point. The stylet has a symmetric point. The stylet can also have a slightly asymmetric point on an opposite side of the barrel point sharpening direction.

In accordance with another aspect of the present invention, a device for biopsy includes a needle assembly having a longitudinal axis, proximal end and a distal end. The device includes a stylet, wherein the stylet includes a point at the distal end. The device includes a barrel, having a proximal end and a distal end. The barrel can move relative to the stylet. Additionally, the device includes a firing mechanism having the relative motion of the barrel and the stylet that slices and collects the biopsy sample. The firing mechanism is configured to reduce firing noise.

In accordance with yet another aspect of the present invention, the stylet includes a magazine with a structurally curved shape. Alternately, the stylet can have a magazine with a striated surface. The firing mechanism can have a dual action spring, a pneumatic damper, or a pneumatic actuation. The dual action spring can have a compression spring with fixed ends. The pneumatic damper is configured to reduce firing noise. Pneumatic power is provided by a tether connection. The barrel and stylet are mounted on a lateral side of the firing mechanism.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 7A-7D illustrate a biopsy motion sequence, according to an embodiment of the present invention.

FIGS. 8A-8C illustrate side and top down views of point geometry and striation of the magazine slot, according to an embodiment of the present invention.

FIGS. 10A-10C illustrate perspective views of dual action springs. Dual action springs are normally "machined" springs, due to their manufacturing type, according to an embodiment of the present invention.

FIGS. 11A and 11B illustrate side views of the pneumatic stopper at the end-of-stroke and the needle in the loaded and fired positions, respectively, according to an embodiment of the present invention.

FIGS. 13A-13C illustrate perspective and side views of the needle biopsy device of the present invention.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

An embodiment in accordance with the present invention provides a new biopsy needle that may address several problems identified with currently available biopsy needles. In short, the new needle has a straighter insertion path, no forward fire, lower noise, and is pneumatic power-assisted so that it can be operated with one hand. These features improve biopsy targeting, provide safer operation for the patient and personnel, reduce patient discomfort, and respectively make optional the help of an assistant at biopsy.

Figures 1A, 1B:
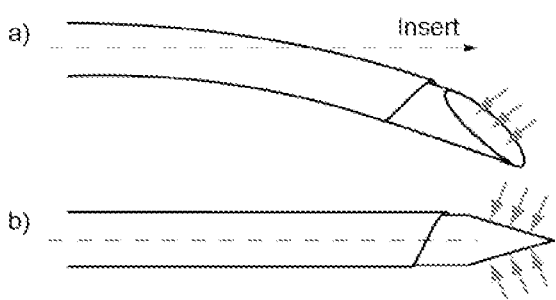
FIGS. 1A and 1B illustrate needle point geometry and insertion path for a common biopsy needle.
Figures 2A, 2B, 2C, 2D:
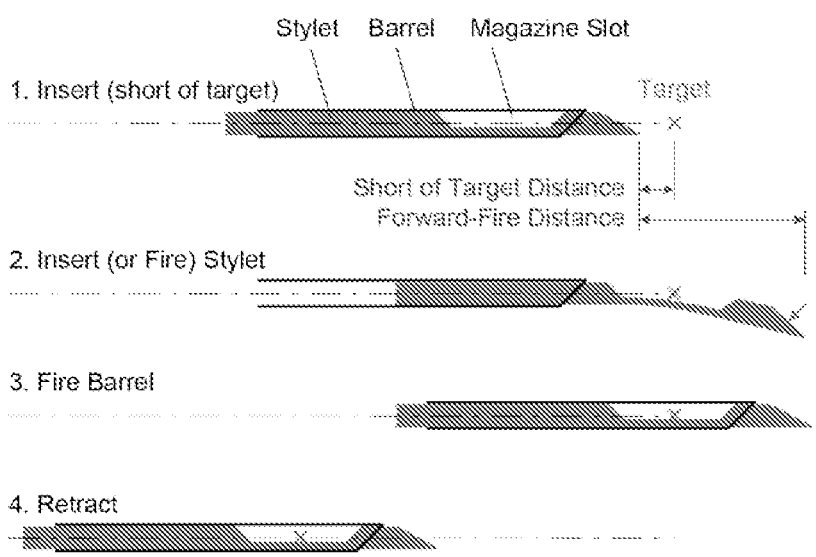
FIGS. 2A-2D illustrate typical biopsy motion sequence of asymmetric point needles.
Figure 3:
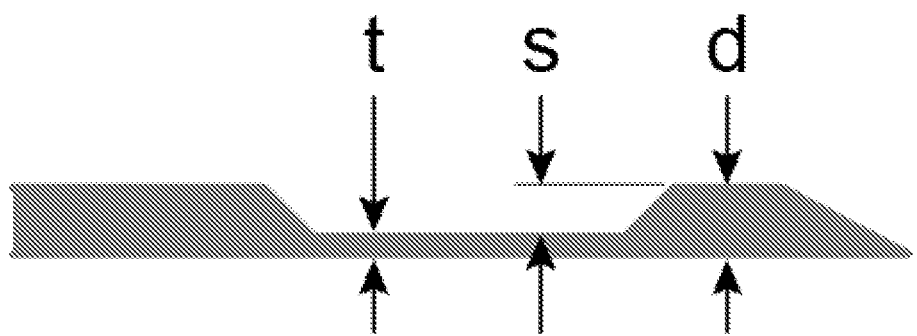
FIG. 3 illustrates a cross sectional thickness of the sample magazine slot.
Figure 4:
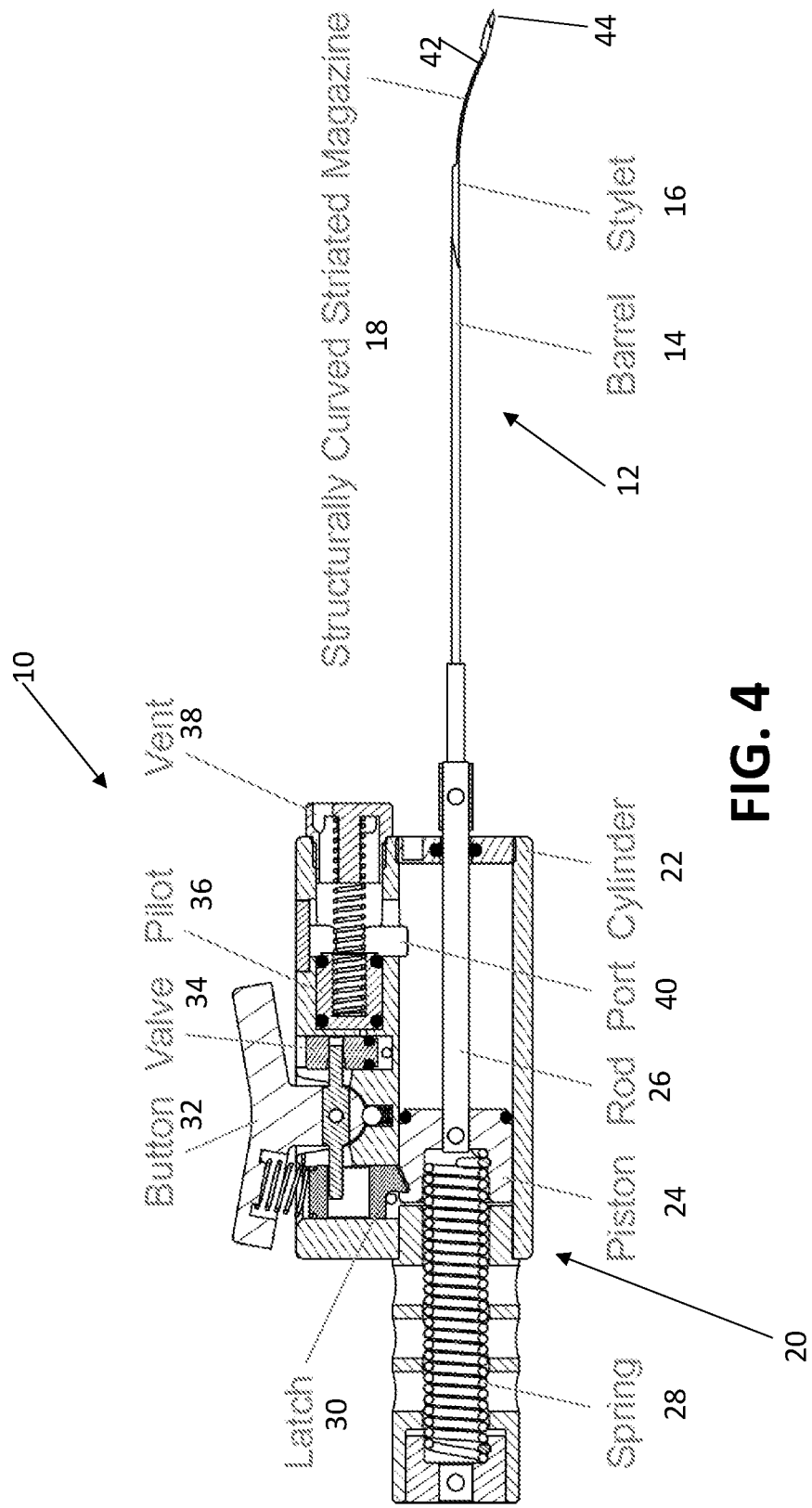
FIG. 4 illustrates a side sectional view of a pneumatic biopsy device, according to an embodiment of the present invention.

FIG. 4 illustrates a side sectional view of a pneumatic biopsy device according to an embodiment of the present invention. As illustrated in FIG. 4 the device 10 includes a needle assembly 12. The needle assembly includes a barrel 14 of the needle assembly and a stylet 16. The stylet 16 is disposed within the barrel 14 of the needle assembly 12. The stylet 16 includes a structurally curved, striated magazine 18 adjacent to its distal end, as illustrated in FIG. 4. Further, the device also includes a body 20, disposed at a proximal end of the needle assembly 12. The body 20 includes a cylindrical housing 22. Inside the cylindrical housing 22 is disposed a piston 24 that actuates a rod 26, that is coupled to the needle assembly 12. The piston 24 is further coupled to a spring 28 and a latch 30 used to actuate the piston 24. The latch 30 is controlled by a button 32. The body 20 also includes a valve 34, pilot 36, and vent 38. A port 40 is also included.

Figure 5:
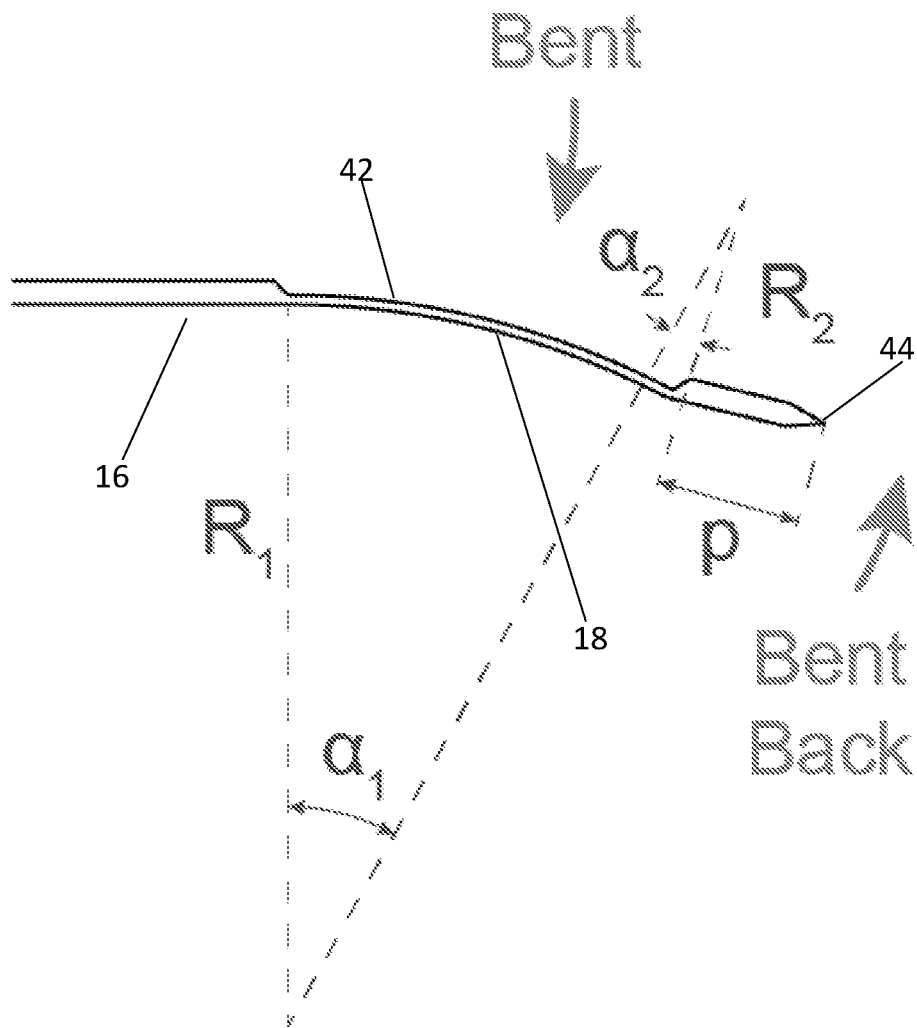
FIG. 5 illustrates a side view of a structural curvature of the magazine slot and back curvature of the symmetric point of the stylet, according to an embodiment of the present invention.

The needle design of the present invention includes several novel features which were derived to circumvent the effects that cause operational problems in typical needles, as follows. As described above, the curvature of the magazine slot 42 is a critical component of the sample collection mechanism. In the classic design this is achieved at biopsy due to the rudder effect of the asymmetric point of the stylet 16 and its forward motion. But both have side effects. A simple way to circumvent the problem is to make the curvature with a structural bend, as shown in FIG. 5. FIG. 5 illustrates a side view of a structural curvature of the magazine slot and back curvature of the symmetric point of the stylet. The size of the curvature ($R_1$, $\alpha_1$) depends on multiple factors including the material of the stylet 16, its diameter (c), the thickness (t) of the magazine 18, length of the slot 42, dynamics of biopsy triggering mechanism (gun), targeted types of tissues. Optimal values are determined experimentally based on tissue sampling tests.

Figures 6A, 6B:
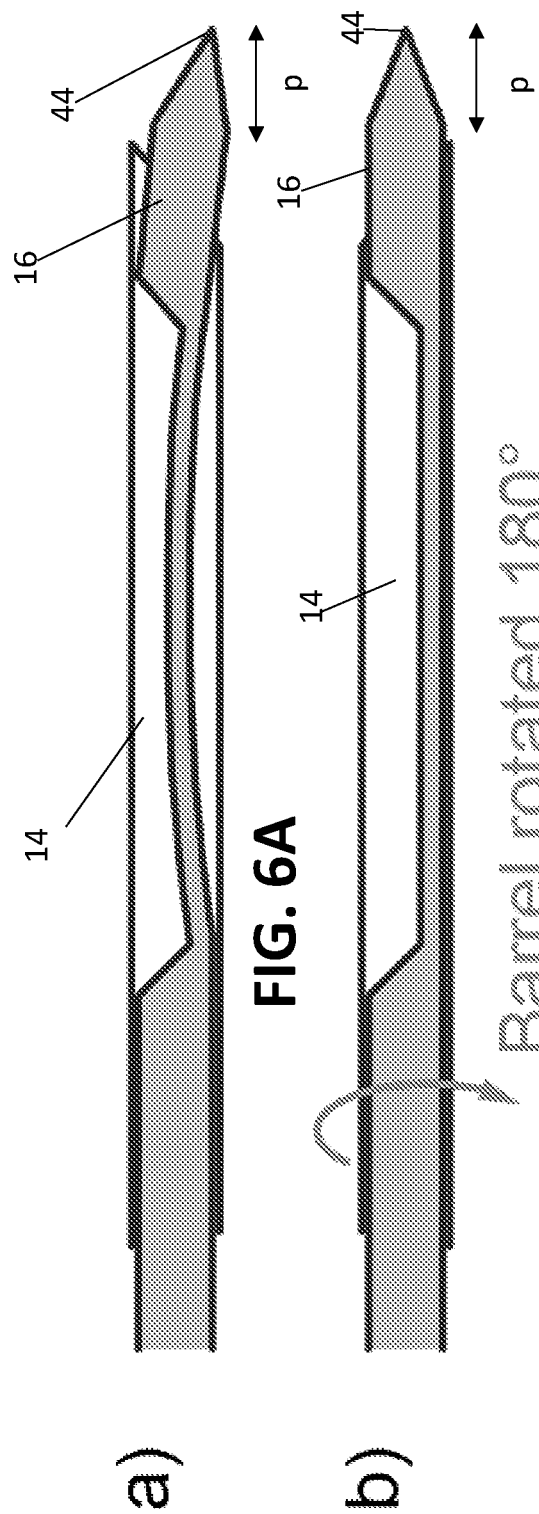
FIG. 6A illustrates a side view of a stylet point that is misaligned.
FIG. 6B illustrates a side view of a stylet with the point lined up by rotating the barrel with 180°, according to an embodiment of the present invention.

FIG. 6A illustrates a side view of a stylet point that is misaligned. FIG. 6B illustrates a side view of a stylet with the point lined up by rotating the barrel with 180°. If the length (p) of the point 44 of the stylet 16 in front of the magazine is large, this is sufficiently encased by the barrel 14 when the barrel 14 is advanced over the stylet 16. However, for clinical reasons the length (p) of the point 44 should be maintained as low as possible in order to minimize the overall depth of insertion to target. While (p) is reduced, the point 44 becomes less constrained within the barrel 14, especially if the barrel 14 is sharpened on the opposite side, and the point 44 is not fully aligned, as shown in FIG. 6A. In this case, the back curvature is helpful to align the point 44 of the stylet 16. The size of the back curvature ($R_2$, $\alpha_2$) depends on the point length (p), the geometry of the barrel sharpening, material properties, and the relative location of the stylet and barrel in the fired configuration. Their values are determined experimentally, as small as needed to align the point 44 within the barrel 14. An alternative option is to rotate the barrel 14 (or stylet 16) 180° at the time of needle insertion, so that the longer part of the barrel sharpening straightens the point 44, as shown in FIG. 6B. Of course, the rotation would have to be restored at the time of biopsy sampling, so that the barrel point is oriented on the side of the stylet magazine. This option, however, complicates the firing mechanism with the additional rotation.

In any case, the structural curve of the magazine is straightened up by the barrel advanced over the stylet. The overall shape remains virtually straight since the barrel is substantially stiffer than the small cross section of the stylet at the magazine. However, if needed, the barrel may be structurally curved in the opposite direction, so that the resulting shape is straight.

As shown above, the asymmetric point of the stylet plays a critical role in the classic mechanism of sample collection. Even though this detrimentally curves the path of needle insertion, the point could not be sharpened symmetrically because of the resulting loss of sample size. However, with the new structurally curved magazine, the point may now be sharpened symmetrically, because this uses a different mechanism of sample collection.

Therefore, a simple modification can now be made to a classic design needles, to alleviate their notorious problem of deflected insertion. This is to re-sharpen the point of the stylet symmetrically (or slightly asymmetrically to balance the barrel bevel), and bend the stylet under the magazine slot as shown in FIG. 5. This only alleviates a problem that classic design needles have, but the gain/effort ratio is high since manufacturers will likely find it very easy to implement.

An additional benefit of the structurally curved magazine is that the forward motion of the stylet is no longer required. As shown above, this has been associated with several targeting, safety, and quality problems which may now be corrected. The new biopsy motion sequence associated with the present invention is presented in FIGS. 7A-7D. FIGS. 7A-7D illustrate a biopsy motion sequence according to an embodiment of the present invention. This includes the same number but different steps, as follows:

1) The needle 12 (stylet 16 and barrel 14) is inserted all the way to the target 46, so that the target 46 is centered on the magazine slot 42, as shown in FIG. 7A. Because the needle 12 should already be at target, imaging may now be used to verify targeting, unlike in the classic sequence.
2) The barrel 14 is then retracted exposing the magazine slot 42 (FIG. 7B). The magazine slot 42 bends due to its structural curvature. The degree of bend is in balance with the stiffness of the surrounding tissues. It is interesting to observe that the bend does not necessarily deteriorate targeting, since the target 46 may be displaced by the bend, so that it remains at the magazine slot 42.
3) The barrel 14 is then rapidly advanced (fired) over the stylet 16 (FIG. 7C). In this motion, the lower side of the barrel 14 pulls the magazine slot 42 up, helping the tissues to be loaded within the magazine slot 42. The sharp point and upper side of the barrel 14 slice the sample.
4) Finally, the needle 12 (stylet 16 and barrel 14 together) is pulled all the way out, as shown in FIG. 7D. The sample is then collected from the magazine slot 42 by retracting the barrel 14. After repositioning the barrel 14 over the point 44, the sequence repeats to the next target from Step 1.

Detail images of the needle point are presented in FIGS. 8A-8C. FIGS. 8A-8C illustrate side and top down views of point geometry and striation of the magazine slot. During the second step of the motion sequence described above, the barrel 14 is fired over the stationary stylet 16. A position during this motion is presented in FIG. 8A. The point 48 of the barrel 14 is oriented on the opposite side of the curvature of the stylet 16. The two create an opening into the cavity of the magazine slot 42 within the barrel 14 that is large relative to the cavity. This large "bite" helps loading the biopsy sample. A series of grooves 50 are also made on the bottom side of the magazine slot 42, as shown in FIG. 8A. These help retain the sample within the magazine slot 42 and fixing it during the slicing motion of the barrel 14, therefore improving sample slicing and loading. The fired position of the needle is shown in FIG. 8B.

An isometric and 2 projection views of the point 48 of the barrel 14 are shown in FIG. 8C. The geometry includes 3 sharpening angles, $u_1$, $u_2$, and $u_3$ that render 4 facets. Typical barrels have a single slanted surface, a bevel point, such the angle $u_1$ alone. The second angle $u_2$ helps reduces the length of the barrel sharpening that in turn reduces the point of the needle in front of the slot (size p in FIG. 5). This creates a longer support of the stylet point within the barrel, as shown in FIG. 8B, and, in addition to the back curvature ($R_2$, $\alpha_2$ in FIG. 5) helps aligning the needle point. The additional advantage of the angle $u_2$ sharpening is that it allows angle $u_1$ to be small (sharp) within a relatively short needle point. The additional bilateral point angle $u_3$ sharpens the point of the barrel further, and is especially useful when $u_1$ is small.

The stylet point is normally sharpened symmetrically about its axis. This may be done with a classic 3 facet, diamond geometry. The geometry of the stylet point may be slightly offset to compensate the rudder effect of the barrel point geometry, if needed. The stylet may then be sharpened slightly asymmetrically, with a larger facet on the opposite side of the barrel bevel to balance the resulting rudder effect. Note that this solution would not be viable for the classic bevel forward-fire needle because it would still deteriorate sampling, as previously discussed.

In the present invention, the length of the magazine slot is not specifically set. With the new motion the stylet is not inserted alone. As shown above, because the stylet is supported by the barrel during insertion, the thickness of the stylet under the magazine (t) may therefore be safely reduced and the length of the magazine may be increased.

In prior biopsy guns, after being fired for biopsy, the barrel is stopped at the end of its stoke with a stopper. The fast moving part impacts the stopper producing large noise. The use of soft materials for the stopper reduces the noise only slightly, due to the high acceleration required to stop the motion in a short distance.

In order to obtain a substantial noise reduction, our approach has been to eliminate the impact. The solution includes two components: Biopsy guns typically use compression only springs. The ends of the spring are not fixed to parts of the gun and the spring remains in a compression state (shorter than its free length) throughout all biopsy steps.

Figure 9:
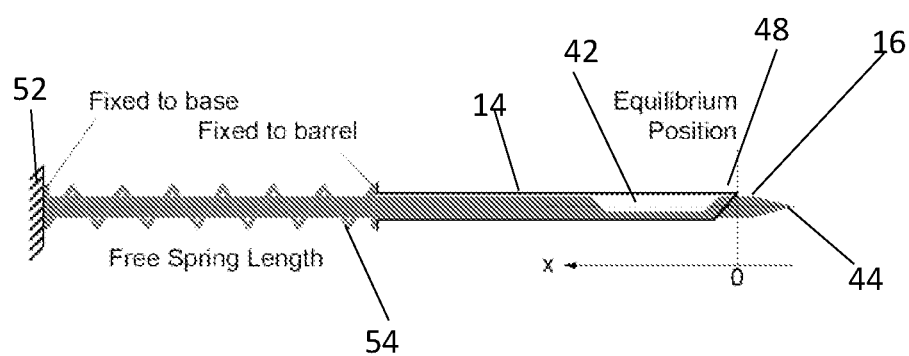
FIG. 9 illustrates a side view of a compression and extension spring, according to an embodiment of the present invention.

Instead, the spring of the present invention is a compression and extension spring. Its ends are attached to the base (normally fixed relative to the body of the needle device) and the barrel, as shown in FIG. 9. FIG. 9 illustrates a side view of a compression and extension spring, according to an embodiment of the present invention. The stylet 16 is also attached to the base 52. The lengths of the stylet, barrel, and spring are so that when the spring 54 is at the equilibrium position (free length, unstretched), the barrel 14 fully closes the magazine slot 42 and its point 48 is properly located under the point 44 of the stylet 16. This equilibrium position represents the fired position of the barrel. A coordinate axis x originated at this location is used for the barrel displacement.

The firing mechanism is preloaded by compressing the spring (x>0). When fired, the spring is released accelerating the barrel. As the point passes the equilibrium point (x<0), the spring switches from compression to extension, reversing its force. This slows down the motion of the barrel without a stopper, as desired. Therefore, the dual action spring serves two purposes, both of which are typically done by a stopper: it sets the fired location and helps stopping the motion.

FIGS. 10A-10C illustrate perspective views of dual action springs. Dual action springs are normally "machined" springs, due to their manufacturing type. Their ends are made so that they can be fixed to other components, as shown in FIG. 10A (one end side). However, machined springs are usually more expensive than regular springs that are rolled of wire. The approach of the present invention has been to adapt a compression spring for dual action by fixing its ends into end parts. A spring 54 with straight axial ends is used, as shown in FIG. 10B. Only one end side of the spring 54 is shown, as the other is similar. The last coil of the spring 54 is encased within the end part 56, and the straight end 58 is placed in a hole 60, as shown in FIG. 10C. A dowel pin 62 is placed through the end part 56, in the space of the last coil, so that it locks down the straight end within the hole 60. This method fixes well to the end of the spring to the end part, providing a simple and more affordable option for the dual action spring.

The dual action spring presented above helps stop the barrel, however motion will substantially overshot the equilibrium position (x=0), and have persistent oscillations, as usual for a spring mass system. This is not acceptable since the barrel point overruns the point of the stylet, creating unnecessary harm to the tissues. This would also defeat our forward-less fire purpose. Moreover, persistent oscillations may cause the sample to be lost. Instead of hitting a rigid stopper, at the end of stroke our additional method to stop the motion with no impact is to use a pneumatic spring-damper mechanism, an air cushion stopper. FIGS. 11A and 11B illustrate side views of the pneumatic stopper at the end-of-stroke and the needle in the loaded and fired positions, respectively. A pneumatic piston is attached to the barrel end, that is in fact is the spring-end part. The piston is placed within a cylinder that is fixed on the needle base. The cylinder presents a relatively large size port. This is placed so that it is closed by the piston when the barrel advances over the equilibrium (fired) position (x=0).

Before firing, the spring 54 is loaded as shown in FIG. 11A. When released, the spring quickly accelerates the piston-barrel assembly. The air in front of the piston 24 is released to the atmosphere through the vent 38. The vent 38 has a large cross section so that the air does not substantially impede the motion of the piston 24. While the piston 24 approaches the zero position, the cross section of the air vent 38 becomes progressively smaller, reducing the vented air flow and raising the pressure in front of the piston 24. This creates a force that opposes the motion, starting to slow the piston 24 down. When the piston 24 reaches the zero position, it closes the air vent 38, trapping the air within the cylinder 22. This creates an air spring that necessarily stops the piston 24 before reaching the end of the cylinder 22 (assuming no leak, pressure would raise to infinity if the piston hit the end. The end of the cylinder 22 also represents a safe hard stop in case of malfunction). The piston 24 springs back (left) towards zero. As soon as the piston 24 passes the zero, the vent 38 reopens releasing the air to atmosphere. This releases the energy of the system, quickly dampening the oscillations to a stop at the zero equilibrium position.

Pneumatic actuation for loading the spring is a logical choice since the stopper is also pneumatic. The piston and cylinder are readily available. As shown in FIGS. 11A and 11B, preloading the spring can be done simply by pressurizing the cylinder through the air vent port. This was realized with a piloted valve mechanism, so that the port has a relatively large size, and is either pressurized or opened to the atmosphere. A command lever and a latch mechanism are also use to command the needle respectively retain the preload of the spring.

Figure 12A:
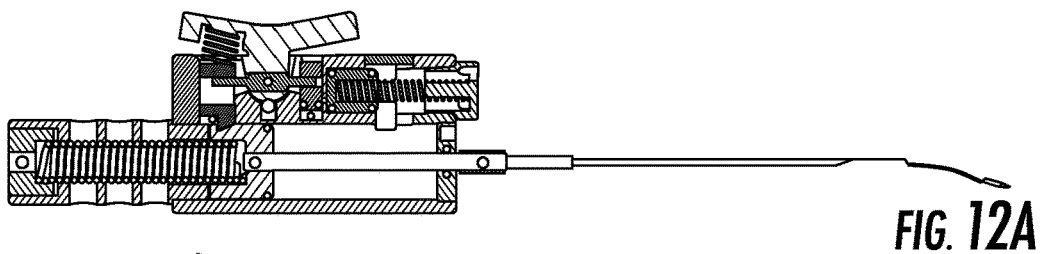
FIGS. 12A-12G illustrate side sectional views of the pneumatic driver and steps of operation, according to an embodiment of the present invention.
Figure 12B:
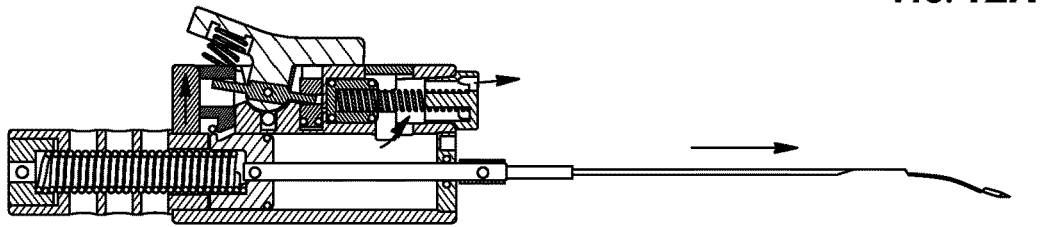
Figure 12C:
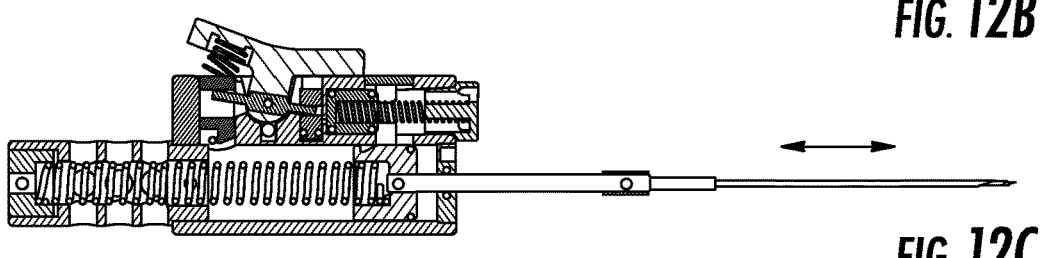
Figure 12D:
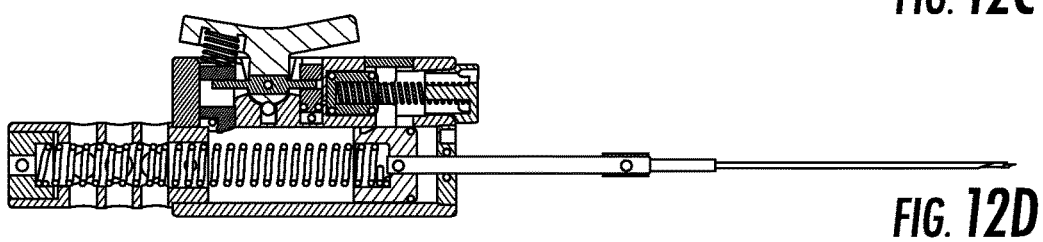
Figure 12E:
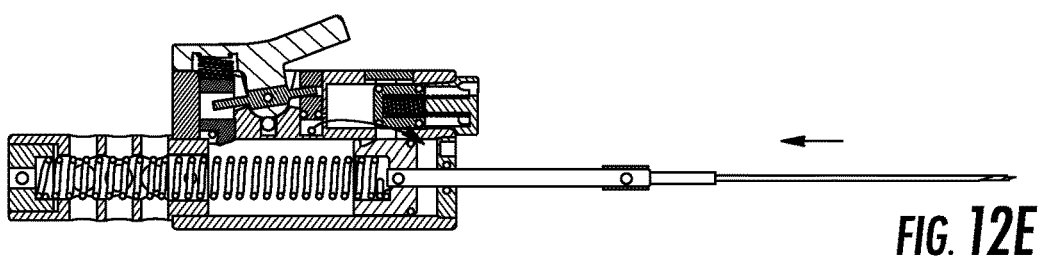
Figure 12F:
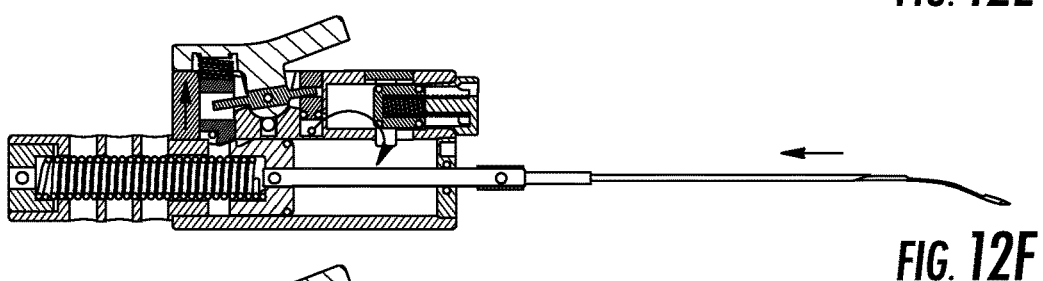
Figure 12G:
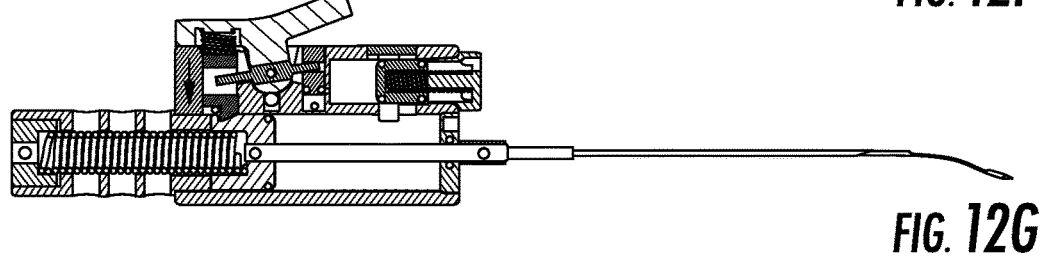

FIGS. 12A-12G illustrate side sectional views of the pneumatic driver and steps of operation, according to an embodiment of the present invention. The overall needle design and the stages of the loading-firing sequence are represented in FIGS. 12 A-12G, as follows:

1) LOADED POSITION: FIG. 12A shows the needle in the spring loaded configuration, ready to fire. Here, the barrel is retracted to uncover the sample magazine of the stylet, which is now curved. The stylet is fixed to the base. The barrel is connected to the piston, which is made within a spring-end part. The piston is locked at the compressed spring location by a latch mechanism. The other spring-end is fixed to the base.
2) Firing the barrel is accomplished by pressing the button forward, as shown in FIG. 12B. This raises a lever that disengages the latch. The spring pushes the piston forward, the barrel fires forward lifting the magazine and slicing the sample. At this time the pilot piston is located to the left under its spring force. This has a large vent port opened, allowing the air in front of the piston to escape, so that the piston may quickly accelerate. The barrel fires over the magazine slicing the sample.
3) The piston then reaches the zero, equilibrium position. This coincides with the position at which the piston closes the vent port, as shown in FIG. 12C. The piston continues its motion forward trapping the air in front of the piston. This air spring and the spring that is now in extension stop the motion quickly, before the piston would impact the end of the cylinder.
4) FIRED POSITION: The piston bounces back releasing the energy pneumatically over the vent, and soon stops near the zero position, as shown in FIG. 12D. This is the fired, relaxed spring position of the mechanism. Here, the button is relaxed to its central, neutral position.
5) Reloading the spring is performed by pressing the button backwards, as shown in FIG. 12E. The lever now raises a valve that allows compressed air to enter the pilot cylinder and pushing the pilot to the right. This closes the air vent, and continues in front of the main piston, causing it to reload the spring.
6) When reaching the back side, the piston lifts the latch as shown in FIG. 12F. The piston continues to move and the latch is pushed down by its spring within a groove of the piston, as shown in FIG. 12G.
7) Returning the button to its middle (neutral) position releases the pressure on the pilot. Under the force of its spring, this reopens the large vent, and releases the loading pressure to atmosphere, as shown in FIG. 12A. This completes the cycle.

Referring to the steps in Section 3.5, the operation of the needle for biopsy proceeds as follows:
1) With needle in fired position (4), insert needle to target
2) Push the button backwards to retract the barrel and load the spring (FIGS. 12E-12G).
3) Push button forward to fire the barrel and collect the sample (FIGS. 12B and 12C)
4) Pull the entire needle out.
5) Push the button backwards to retract the barrel and place the sample in a jar (FIGS. 12E-12G).
6) Push the button forward to prepare for the next biopsy (FIGS. 12B and 12C)

The biopsy needle requires one hand operation. Biopsy guns are typically loaded manually, and normally require both hands to reload. Since the biopsy procedure is normally guided by medical imaging, commonly the ultrasound that is also manually held, it is difficult for the physician to reload the gun him or herself. As such, the biopsy procedure is normally done with help form an assistant. The pneumatic loading mechanism of the new needle makes the use of the assistant optional.

The present invention represents the first device that uses pneumatics as a source of power to load the biopsy firing mechanism. The use of a motorized mechanism in combination with the impact-less stopper, makes it possible to use a substantially stiffer spring, that otherwise would be hard to preload manually and would aggravate the noise problem of typical needles. In turn, the stuffer spring generates higher force, causing higher barrel accelerations and therefore cutter velocity in order to improve tissue slicing at biopsy.

The biopsy needle assembly is presented in FIGS. 13A-13C. FIGS. 13A-13C illustrate perspective and side views of the needle biopsy device of the present invention. This is the same device presented in cross section in FIGS. 12A-12G. It includes the pneumatic driver 64 and the needle 12. Even though the needle 12 could be placed coaxially with the piston 24 of the pneumatic driver 64, it has been shifted to the side of the driver, so that the needle may be placed close to other medical devices, such as ultrasound probes for image guidance. A pressure port 70 is also included.

The stylet 16 attaches with a release tab 66 to the body of the driver. The barrel presents a lateral barrel release tab 68 that clips onto the rod of the piston 24. As previously described above with respect to FIGS. 9 and 10A-10C, the firing spring is a dual action spring that is connected to one end to the case of the driver, and at the other to the piston. As such, the rotation of the piston is constrained by the spring. When a helical spring changes its compression state its ends are slightly turning relative to one another. If the needle is not connected to the driver, this will cause the piston rod to rotate slightly when the mechanism is loaded and fired. When the needle is mounted to the driver, the rotation is blocked by the parallel structure formed between the piston rod and the stylet. Since this is stiffer at the loaded position, the piston should be attached to the spring so that the piston rod is properly aligned with the needle when the mechanism is fired. Even though additional constraints could be imposed to prevent the rotation of the piston, these would likely deteriorate dynamical performance while fired, and the one of the needle is adequate. The needle is fired with load/fire button 72

The pneumatic driver requires regulated gas pressure as a source of power, supplied through the pressure port. This may be may be compressed air or another gas such as compressed $CO_2$. The pressure may be provided from a supply line such as the compressed air line of the medical facility.

Typical biopsy guns are either disposable, in case that the needle is not removable from the device and the entire gun assembly is sterilized for one use, or have a reusable biopsy gun that is cleaned and sterilized after each use and a removable needle that is replaced with a new sterile one. The pneumatic driver of the new device is sufficiently simple to be manufactured as a disposable part. However, in the present design the needle is removable as illustrated in FIGS. 13A-13C, and the driver could be reused. A novel possible solution for single-multiple use and sterilization is to retain the driver for multiple use and provide for single-use the needle and case.

The present invention includes a number of novel features. For instance, one novel feature is the structurally curved magazine slot geometry. The point of the needle can be back bent or the barrel and stylet rotated 180° in order to align the stylet point within the barrel when the stylet is retracted. A classic needle can also include the feature of the structurally curved magazine slot and/or the back bent point or rotation of the barrel/stylet. Forward-less fire biopsy motion is also novel in the context of magazine defection. The striated magazine slot is novel, as is the 4-facet point geometry. These features would also improve convention biopsy needles. The stylet can have a slightly asymmetric point to compensate for barrel bevel, by balancing the rudder effect. The slot of Cl also enables a longer and wider magazine slot. The device can include the use of a dual action spring in the biopsy gun, and a compression spring can be used as a dual action spring. This applies to any mechanism, not only biopsy devices. The device can include a pneumatic stopper and a cylinder with a port that is closed by the piston when the motion is to be stopped. These features may have wider applicability than biopsy devices. A method of reducing firing noise of guns is also included as a feature of the present invention.

The device can include a pneumatic piloted mechanism for loading the spring. The pilot opens and closes the air vent, toggling the functionality of the cylinder port between a venting exhaust and pressurized inlet. A latch and valve coordinated by the use of the button lever. A method of supplying pressure to the device from a line is also included. The device can be single or multi-use device with disposable case.

Table 1 shows innovative features of the present invention that solve the problems of current devices.

TABLE 1

Innovative features of the new biopsy needle

| Typical Needles | | New Needle | | |
| --- | --- | --- | --- | --- |
| Feature | Problem | Feature | Gain | Potential Advantage |
| Asymmetric sharpening of the needle point | Curved needle insertion path. Difficult to control needle targeting. | Symmetric point Curved and striated sample magazine. Four-facet barrel point | (1) Straighter insertion path Improved loading of the tissue sample | Improved targeting Improved pathologic evaluation |
| Sampling sequence with forward motion of the stylet and barrel | Possibly hitting critical anatomy. Unsafe to handle. Needle insertion short of target makes targeting more difficult. | New sampling sequence with (2) forward-less fire | No motion past needle point | Safer for patient and personnel |
| | | | Insert needle to target | Simpler targeting |
| | | | Insert stylet together with barrel | Better support of the needle tip within the barrel. Less likely to break stylet point. Safer. |
| | | | Smaller cross section of the needle under the sample magazine thus larger sample. | Improved pathologic evaluation |
| Firing mechanism with hard stop at the end of travel | Noisy operation causes patient stress and motion. | Dynamic air cushioned stop. | No impact. (3) Low noise | Less patient discomfort and motion. Improved targeting. |
| Firing mechanism armed manually | Usually requires two hand operation. Two person operation. | (4) Pneumatic power-assisted | One hand operation possible | Optional use of assistant |
| | Relatively low firing force and biopsy slicing speed | | Higher force and speed. Improved sampling. | Improved pathologic evaluation |

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device for biopsy comprising:
a needle assembly having a longitudinal axis, a proximal end and a distal end, wherein the longitudinal axis extends from the proximal end to the distal end of the needle assembly;
a stylet, wherein the stylet has a proximal end and a distal end, wherein the stylet comprises a point at the distal end, and wherein the stylet comprises a magazine for loading the biopsy sample, wherein the magazine has a structurally curved shape, wherein the magazine has a proximal end and a distal end, wherein the structurally curved shape of the magazine is curved with respect to a longitudinal axis of the magazine, and wherein the longitudinal axis of the magazine extends from the proximal end to the distal end of the magazine;
a barrel, having a proximal end and a distal end, and wherein the barrel is configured to move over the stylet, wherein the distal end of the barrel comprises a slanted surface, wherein the slanted surface comprises a first slant at a first angle, and a second slant at a second angle to the first slant;
a firing sequence having a relative motion of the barrel and the stylet that slices and collects the biopsy sample; and
wherein the distal end of the stylet is bent back in an opposite direction of the structurally curved shape of the magazine, such that the distal end of the stylet is oriented straight along the longitudinal axis of the needle when the distal end of the barrel is near the point of the stylet.

2. The device of claim 1, wherein the magazine comprises striations, wherein the striations are oriented latitudinally, perpendicular to the longitudinal axis of the magazine.

3. The device of claim 1 wherein the barrel and the point of the stylet have bevel points.

4. The device of claim 1 wherein the firing sequence does not advance any needle components past the distal end of the stylet.

5. The device of claim 1 wherein the barrel and stylet rotate relatively to orient the point of the stylet straight along the longitudinal axis of the needle.

6. The device of claim 1 wherein the firing sequence comprises retracting the barrel relative to the stylet and then readvancing the barrel.

7. The device of claim 1 wherein the barrel comprises a 4-facet sharp point.

8. The device of claim 1 wherein the point of the stylet comprises a symmetric point.

9. The device of claim 1 wherein the point of the stylet comprises a slightly asymmetric point on an opposite side of the barrel point sharpening direction.

10. A device for biopsy comprising:
- a needle assembly having a longitudinal axis, a proximal end and a distal end, wherein the longitudinal axis of the needle assembly extends from the proximal end to the distal end of the needle assembly;
- a stylet, wherein the stylet has a proximal end and a distal end, wherein the stylet comprises a point at the distal end;
- a barrel, having a proximal end and a distal end, and wherein the barrel is configured to move relative to the stylet, wherein the distal end of the barrel comprises a slanted surface, wherein the slanted surface comprises a first slant at a first angle, and a second slant at a second angle to the first slant;
- a firing mechanism having a relative motion of the barrel and the stylet that slices and collects the biopsy sample, wherein the stylet is configured to be advanced to a biopsy sample site before the firing mechanism is engaged, and wherein the firing mechanism is configured to reduce firing noise;
- wherein the stylet comprises a magazine, wherein the magazine has a proximal end and a distal end, wherein the magazine has a longitudinal axis that extends from the proximal end to the distal end of the magazine, wherein the magazine has a structurally curved shape, and wherein the structurally curved shape is curved with respect to the longitudinal axis; and
- where the structurally curved shape of the magazine is deflected downward relative to the longitudinal axis of the magazine, wherein the distal end of the stylet is bent back in an opposite direction of the structurally curved shape of the magazine, such that the distal end of the stylet is oriented straight along the longitudinal axis of the needle when the distal end of the barrel is near the point of the stylet.

11. The device of claim 10, wherein the magazine comprises striations, wherein the striations are oriented latitudinally, perpendicular to the longitudinal axis of the magazine.

12. The device of claim 10 wherein the firing mechanism comprises a dual action spring.

13. The device of claim 10 wherein the firing mechanism comprises a pneumatic damper.

14. The device of claim 10 wherein the firing mechanism comprises a pneumatic actuation.

15. The device of claim 12 wherein the dual action spring comprises a compression spring with fixed ends.

16. The device of claim 14 further comprising pneumatic power being provided by a tether connection.

17. The device of claim 10 wherein the barrel and stylet are mounted on a lateral side of the firing mechanism.

* * * * *